United States Patent [19]

Mecklenburg

[11] Patent Number: 5,298,549
[45] Date of Patent: Mar. 29, 1994

[54] REINFORCED POLYPROPYLENE MOLDING COMPOSITION

[75] Inventor: Thomas Mecklenburg, Butzbach, Fed. Rep. of Germany

[73] Assignee: Hoechst Aktiengesellschaft, Frankfurt, Fed. Rep. of Germany

[21] Appl. No.: 916,170

[22] Filed: Jul. 17, 1992

[30] Foreign Application Priority Data

Jul. 19, 1991 [DE] Fed. Rep. of Germany ....... 4123965

[51] Int. Cl.$^5$ .......................... C08K 3/34; C08L 23/12
[52] U.S. Cl. .................................... 524/445; 524/446; 524/447; 525/232; 525/237
[58] Field of Search ................. 524/445; 525/232, 237

[56] References Cited

U.S. PATENT DOCUMENTS

| | | | |
|---|---|---|---|
| 4,210,579 | 7/1980 | Grigo et al. | 525/232 |
| 5,086,109 | 2/1992 | Ueno et al. | 524/413 |
| 5,124,193 | 6/1992 | Sano et al. | 524/445 |

FOREIGN PATENT DOCUMENTS

| | | |
|---|---|---|
| 0069479 | 1/1983 | European Pat. Off. . |
| 0153415 | 9/1985 | European Pat. Off. . |
| 0204400 | 12/1986 | European Pat. Off. . |
| 0426315 | 5/1991 | European Pat. Off. . |
| 2026394 | 12/1970 | Fed. Rep. of Germany . |
| 2735027 | 2/1978 | Fed. Rep. of Germany . |
| 1017959 | 1/1966 | United Kingdom . |
| 2228477 | 8/1990 | United Kingdom . |

OTHER PUBLICATIONS

Database WPIL, JP 59 166 544, Derwent Publications Ltd., London, Sep. 1984.
Database WPIL, JP 57 177 038, Derwent Publications Ltd., Lond, Oct. 1982.

*Primary Examiner*—Paul R. Michl
*Assistant Examiner*—Olga Asinovsky
*Attorney, Agent, or Firm*—Connolly and Hutz

[57] ABSTRACT

A polypropylene molding composition which comprises, as the reinforcing substance, a clay mineral of specific composition shows an improved profile of properties compared with known polypropylene molding compositions reinforced with talc. The impact strength of molding compositions which have not been finished with impact modifiers increases considerably, while the strength, in particular the ball indentation hardness, of molding compositions finished with impact modifiers increases. Generally, an improvement in scratch resistance and surface quality is to be observed compared with molding compositions reinforced with talc.

14 Claims, No Drawings

REINFORCED POLYPROPYLENE MOLDING COMPOSITION

DESCRIPTION

The invention relates to a polypropylene molding composition which is reinforced with a clay mineral of specific composition and, in particular, displays a significantly shifted, advantageous profile of properties compared with talc-reinforced polypropylene molding compositions.

Reinforced polypropylene molding compositions are widely used in automobiles, both in the interior and, with an appropriate light-stabilizing finish, in the exterior region.

The reinforcing substance chiefly employed in polypropylene for these uses is talc, a naturally occurring silicate having the composition $Mg_3[Si_4O_{10}](OH)_2$ with a lamina structure. On the basis of the more or less pronounced aspect ratio, depending on the working up (grinding, air separation or the like) of the mineral, of between usually 30:1 and 10:1, talc reinforcement has the effect of increasing the flexural strength, but decreasing the toughness as the talc content in the polypropylene molding composition increases. For uses in automobiles, the toughness, in particular the low temperature impact strength, can be greatly improved with the aid of thermoplastic elastomers (for example EP(D)M), although a decrease in the flexural strength values must be expected as the impact strength modifier content increases.

Reinforced polypropylene molding compositions usually have the following composition:
about 40 to 95 parts by weight of propylene homo- or propylene-ethylene copolymer,
about 0 to 30 parts by weight of thermoplastic elastomer,
about 5 to 60 parts by weight of talc,
about 0.1 to 2 parts by weight of antioxidants,
about 0.1 to 2 parts by weight of light-stabilizing finish,
about 0 to 10 parts by weight of colored pigments and 0 to 0.5 part by weight of organic peroxide to establish the desired melt viscosity.

Particular advantages of talc-reinforced polypropylene molding compositions over the ABS copolymers and ABS-polycarbonate blends likewise employed for the abovementioned uses in automobiles are:
the outstanding flow properties of the melt, in particular of CR products having narrow molecular weight distributions (CR = Controlled Rheology);
the good acoustic insulating capacity (muffled acoustic pattern);
the smooth surface;
the good heat distortion point under a low load;
the very good resistance to chemicals;
the good resistance to weathering with an appropriate light-stabilizing finish;
the good recyclability; and
the relatively low price.

On the other hand, disadvantages of talc-reinforced polypropylene molding compositions are:
the inadequate rigidity/toughness ratio for some uses;
the low value of the low temperature impact strength and notched impact strength of PP molding compositions which have not been impact-modified, especially at temperatures of below $-10°$ C.;
the often unsatisfactory quality of the surface, impaired by differences in gloss (so-called displacement lines) and flow markings, especially as the talc particle size increases, as the melt viscosity increases or as the melt flow index decreases, in impact-modified PP molding compositions and with dark color formulations;
the lack of scratch resistance especially with dark color formulations and in impact-modified molding compositions, because of the relatively low ball indentation hardness and because of the specific properties of talc, such as, for example, the low Mohs' hardness $(=1)$;
the reduced strength and clearly visible arching in the region of weld lines.

Talc-reinforced and impact-modified PP molding compositions are described in various publications (cf., for example, DE 27 35 027, EP 069 479, EP 153 415, EP 204 400, EP 426 315). Clay is also mentioned as a possible filler and reinforcing substance in these publications, but is not specified in more detail.

It has been found that polypropylene molding compositions having improved properties are obtained by using a specific clay mineral.

The invention thus relates to a reinforced polypropylene molding composition, consisting essentially of
30 to 95 parts by weight
of a partly crystalline isotactic propylene homopolymer having an isotactic content of $>80\%$, a degree of crystallinity of $>50\%$ and a melt flow index (230/5) of 0.5 to 1000 g/10 minutes, or
of a partly crystalline syndiotactic propylene homopolymer having a syndiotactic content of $>80\%$, a syndiotactic sequence length of $>10$, a degree of crystallinity of $>30\%$ and a melt flow index (230/5) of 0.5 to 1000 g/10 minutes, or
of a partly crystalline propylene-ethylene, propylene1-olefin or propylene-ethylene-1-olefin-block copolymer or terpolymer with $C_4$-$C_8$-1-olefins, having an ethylene and/or 1-olefin content of 2 to 30% by weight and a melt flow index (230/5) of 0.5 to 1000 g/10 minutes, or
of a partly crystalline random propylene/ethylene/1-olefin, propylene/1-olefin or propylene/ethylene/1-olefin(ter)-copolymer having an ethylene or/and 1-olefin content of 0.5 to 30% by weight and a melt flow index (230/5) of 0.5 to 1000 g/10 minutes,
0 to 30 parts by weight,
of a thermoplastic ethylene-propylene or/and ethylene5 propylene-diene rubber having an ethylene content of $>45$ by weight and a Mooney viscosity ML (1+8) at 127° C. of 20 to 70,
0 to 10 parts by weight
of an unbranched polyethylene having a density of 0.94 to 0.965 g/cm$^3$ and a degree of crystallinity of 60 to 80%, and 5 to 60 parts by weight
of a clay mineral having an $SiO_2$ content of 55 to 80% by weight and an $Al_2O_3$ content of 10 to 30% by weight, a particle size of at least 95% $<20$ μm and a high fine particle content with at least 60% $<2$ μm.

The polypropylene molding composition according to the invention comprises using a naturally occurring clay mineral of specific composition as the reinforcing substance. This clay mineral has been employed to date mainly only in the ceramics industry. When the relatively coarse-particled clay mineral is worked up, a so-called filter dust is obtained, which is distinguished by a mainly very low particle size. A uniformly finely divided mineral powder having, for example, a top cut (at least 95%) of <20 μm and also 85 to 90% <6 μm is obtained by air separation. This mineral powder furthermore can be calcined.

According to complete silicate analysis, a sample of the non-calcined clay filter dust used has the following chemical composition:
76% by weight of $SiO_2$
16% by weight of $Al_2O_3$
4% by weight of $K_2O$
1.5% by weight of $Fe_2O_3$
0.5% by weight of MgO
0.7% by weight of $TiO_2$
1.3% by weight of trace elements
5.0% by weight of loss on ignition.

This corresponds to a mineralogical composition of
about 45% by weight of muscovite (mica)
about 39% by weight of quartz
about 14% by weight of kaolinite
about 2% by weight of secondary constituents.

The chemical and mineralogical composition thus differs considerably from that of the clay mineral kaolin mentioned in known molding compositions, the main component of which is kaolinite $Al_2[Si_2O_5](OH)_4$ which has a similar $Al_2O_3$:$SiO_2$ ratio to alumina: 46% of $Al_2O_3$ + 54% of $SiO_2$. Another feature of the clay mineral used is the relatively high Mohs' hardness of 3–3.5, compared with the value of 1 for talc.

The polypropylene molding composition according to the invention comprises at least one of the following polymers:

1a) a partly crystalline isotactic propylene homopolymer having an isotactic content of >80%, a degree of crystallization of >50% and a melt flow index (230/5) in the range from 0.5 to 1000 g/10 minutes, or 1b) a partly crystalline syndiotactic propylene homopolymer having a syndiotactic content of >80%, a syndiotactic sequence length of >10, a degree of crystallization of >30% and a melt flow index (230/5) in the range from 0.5 to 1000 g/10 minutes, or 1c) a partly crystalline propylene-ethylene, propylene-1-olefin or propylene-ethylene-α-olefin block copolymer or terpolymer with 1-olefins $C_nH_{2n}$ (n=4–8), having an ethylene or/and 1-olefin content of 2–30% by weight and a melt flow index (230/5) in the range from 0.5 to 1000 g/10 minutes, or 1d) a partly crystalline random propylene-ethylene, propylene-1-olefin or propylene-ethylene-1-olefin copolymer or terpolymer having an ethylene and/or 1-olefin content of 0.5 to 30% by weight and a melt flow index (230/5) in the range from 0.5 to 1000 g/10 minutes;

2) a thermoplastic ethylene-propylene (EPM) or/and ethylene-propylene-diene (EPDM) rubber having an ethylene content of >45% by weight without a diene, up to very high diene contents, and having a Mooney viscosity ML (1+8) at 127° C. in the range from 20 to 70;

3) if appropriate an unbranched HD polyethylene having a density of 0.94 to 0.965 g/cm³ and a degree of crystallization of 60–80%.

The molding composition according to the invention furthermore comprises 4) a clay mineral having an $SiO_2$ content of 65±10% by weight, preferably 63 to 66% by weight, and an $Al_2O_3$ content of 20±10% by weight, preferably 19 to 22% by weight, and a particle size/top cut of <20 μm, as a filler and reinforcing substance.

The polypropylene molding composition according to the invention can additionally also contain the following constituents;

5) oxidation stabilizers, such as, for example, sterically hindered phenols, thioethers, phosphites and phosphonites;

6) a light-stabilizing finish for internal and/or external uses with UV absorbers and/or HALS (=hindered amine light stabilizers);

7) processing auxiliaries, such as lubricants/acid scavengers and antistatics;

8) antistatics;

9) colored pigments.

The melt viscosity and the processing properties of the molding compositions can be adjusted by chemical degradation by means of organic peroxides. Suitable peroxides are 2,5-dimethyl-2,5-bis(tert-butoxy)-hexane, di-t-butyl peroxide and others.

The polypropylene molding composition according to the invention comprises the above components 1) to 9) in the following amounts:
1) 30 to 95, preferably 50 to 90 parts by weight,
2) 0 to 30, preferably 5 to 20 parts by weight,
3) 0 to 10, preferably 1 to 3 parts by weight,
4) 5 to 60, preferably 10 to 40 parts by weight,
5) 0.1 to 2, preferably 0.1 to 1.0 part by weight,
6) 0.1 to 3, preferably 0.2 to 0.5 part by weight,
7) 0.1 to 3, preferably 0.1 to 1.5 parts by weight, and
8) 0 to 10, preferably 0.2 to 2 parts by weight.

The individual components are compounded with the aid of customary single- or twin-screw compounders, in particular with twin-screw extruders. The material temperatures in the extruder are as a rule in the range from 180° to 270° C.

The resulting strands are cut to pellets having an average length of 2 to 5 mm with the aid of a granulator.

Processing of the granules to injection-molded components, for example to test specimens corresponding to ISO and DIN standards for testing the mechanical, thermal and electrical properties of the polypropylene molding composition, is carried out with the aid of customary screw-plunger injection molding machines. The material temperatures in the injection molding machine are usually in the range from 180° to 300° C. and the flow front speeds are between 50 and 500 mm/sec.

The properties of the polypropylene molding composition is determined on the test specimens in accordance with the following ISO and DIN standards:
tensile tests corresponding to DIN 53 455,
modulus of elasticity in tension corresponding to DIN 53 457,
bending tests corresponding to DIN 53 452,
bending modulus corresponding to ISO R 178,
Charpy impact strength corresponding to ISO R 179/1eU,
Charpy notched impact strength corresponding to ISO R 179/1eA,
ball indentation hardness corresponding to DIN 53 456,
heat distortion temperature A corresponding to ISO R 75,
melt flow index corresponding to DIN 53 735 and the like.

Compared with talc reinforcement, clay mineral reinforcement results in a characteristic shift of the profile of properties of polypropylene molding compositions.

In particular, the very different influence of clay mineral reinforcement on the strength/toughness ratio of PP molding compositions which have been impact-modified with EP(D)M and those which have not been impact-modified compared with talc-reinforced PP molding compositions is surprising:

in the case of polypropylene molding compositions which have not been impact-modified and have a clay content of, for example, 20% by weight, the impact strengths at temperatures above −10° C., in particular above the glass transition temperature of PP, are up to 40%, depending on the measurement method, more than the values of corresponding talc-reinforced molding compositions. The improvement in the notched impact strengths at temperatures > −10° C. is less pronounced. On the other hand, no improvement in the low temperature impact strength and notched impact strength at temperatures <0° C. is to be found. The strength values (tensile and bending test) of the polypropylene molding compositions reinforced with clay mineral are slightly reduced and the E modulae are reduced by up to 15%.

In the case of impact-modified polypropylene molding compositions reinforced with clay mineral, for example having an EP(D)M content of 10% by weight, in contrast, the impact strength at a temperature >10° C. is up to 15% and the notched impact strength up to 30% below the values of the corresponding talc-reinforced polypropylene molding compositions. On the other hand, no differences are to be found in the low temperature impact strength and notched impact strength. The strength of impact-modified polypropylene molding compositions reinforced with clay mineral is slightly above and the ball indentation hardness is considerably (up to 15%) above the values of talc-reinforced polypropylene molding compositions.

Generally, an improved scratch resistance and an improved surface quality are to be found in all polypropylene molding compositions reinforced with clay mineral compared with talc-reinforced polypropylene molding compositions. In particular, the slide lines which often occur with impact-modified talc-reinforced molding compositions are still visible only to a very small extent.

The following examples are intended to illustrate the invention.

COMPARISON EXAMPLE A

The following were mixed in a fluid mixer:
78.0 parts by weight of a partly crystalline isotactic propylene homopolymer having an isotactic content of >90%, a degree of crystallization of about 65% and a melt flow index (230/5) of 7–9 g/10 minutes;
2.0 parts by weight of a talc having a relatively wide particle size distribution; cut(80%) <20 μm, cut(50%) <10 μm;
0.3 part by weight of octadecyl-3-(3,5-di-tert-butyl-4-hydroxyphenyl)-propionate;
0.3 part by weight of di-octadecyl sulfite;
0.4 part by weight of calcium stearate and bis-stearoyl/-palmitoyl-ethylenediamine in a ratio of 3:1,
0.7 part by weight of Acetogen carbon black.

Compounding of the powder mixture and subsequent granulation were carried out with the aid of a W&P ZSK 53 twin-screw extruder at a maximum barrel temperature of 230° C. and a maximum material temperature of 250° C.

The resulting granules were processed to DIN and ISO test specimens with the aid of a KM 90-210 B screw-piston injection molding machine at a material temperature of not more than 240° C. The abovementioned DIN and ISO tests were carried out.

EXAMPLE 1

The procedure of comparison example A was repeated, with the exception of the reinforcing substance, which was replaced by 22.0 parts by weight of clay (65.4% of $SiO_2$, 20.3% of $Al_2O_3$) having a low particle size - cut (at at least 95%) <20 μm, cut (85 to 90%) <6 μm.

COMPARISON EXAMPLE B

The following were mixed in a fluid mixer:
70.0 parts by weight of a propylene-ethylene block copolymer having an isotactic content of about 80%, an atactic content of about 5%, an ethylene content of about 7.5% and a melt flow index (230/5) of 20–30 g/10 minutes;
20.0 parts by weight of a talc having a relatively low particle size: top cut (99%) <20 μm, cut (86%) <10 μm.
10.0 parts by weight of a commercially available impact modifier consisting of: 60% by weight of an EPM rubber having an ethylene content of about 48%,
30% by weight of an ethylene-propylene block copolymer and
10% by weight of HDPE;
0.2 part by weight of pentaerythrityl tetrakis[3-(3,5-di-t-butyl-4-hydroxyphenyl)propionate];
0.3 part by weight of calcium stearate and bisstearoyl/-palmitoylethylenediamine corresponding to comparison example A;
3 part by weight of a light stabilizer (UV absorber);
2.0 parts by weight of colored pigment (ultramarine blue and Acetogen carbon black)

Compounding and processing to injection-molded components or test specimens were carried out in accordance with comparison example A.

COMPARISON EXAMPLE C

The procedure of comparison example B was repeated, with the exception that the acid scavenger Ca stearate was replaced by 0.2 part by weight of MgO.

EXAMPLE 2

The procedure of comparison example C was repeated, with the exception that the reinforcing substance was replaced by 20 parts by weight of clay mineral corresponding to Example 1.

COMPARISON EXAMPLE D

The following were mixed in a fluid mixer:
80.0 parts by weight of a propylene-ethylene block copolymer having an isotactic content of about 80%, an atactic content of about 5%, an ethylene content of about 10% and a melt flow index (230/5) of 20–30 g/10 minutes;
20.0 parts by weight of a talc having a relatively low particle size (corresponding to comparison example B);
0.5 part by weight of a combination of a commercially available phenolic and a phosphitic oxidation stabilizer;

0.3 part by weight of a combination of Ca stearate and a commercially available wax (corresponding to comparison example B);
0.3 part by weight of a light stabilizer;
0.98 part by weight of colored pigments for generating a specific black color.

EXAMPLE 3

The procedure of comparison example D was repeated with the exception that the reinforcing substance was replaced by 20 parts by weight of clay mineral corresponding to Example 1.

TABLE 1

| Properties | Unit | Comparison A Talc | Example 1 Clay |
|---|---|---|---|
| Ignition residue (1h, 625° C.) | % | 20.2 | 21.0 |
| Melt flow index | | | |
| MFI 230/5 | g/10 minutes | 10.0 | 9.8 |
| MVI 230/5 | g/10 minutes | 12.6 | 10.8 |
| Density | g/cm$^3$ | 1.058 | 1.063 |
| Ball indentation hardness | | | |
| 30 seconds | N/mm$^2$ | 80 | 85 |
| 10 seconds | N/mm$^2$ | 85 | 91 |
| Yield stress | N/mm$^2$ | 34 | 33.5 |
| Elongation | % | 6 | 6.2 |
| Stress at break | N/mm$^2$ | — | — |
| Elongation at break | % | — | — |
| Stress at 50% | N/mm$^2$ | 10 | 17 |
| Modulus of elasticity in tension (Secant) | N/mm$^2$ | 2800 | 2500 |
| 3.5% bending stress | N/mm$^2$ | 44 | 44 |
| Maximum bending stress | N/mm$^2$ | 50 | 49 |
| Maximum edge fibre elongation | % | 6.1 | 6.0 |
| Modulus of elasticity in bending (tangent) | N/mm$^2$ | 2700 | 2500 |
| Impact strength | | | |
| +23° (Charpy) | mJ/mm$^2$ | 46 | 55 |
| −20° | mJ/mm$^2$ | 18 | 18 |
| Notched impact strength | | | |
| (Charpy) +23° | mJ/mm$^2$ | 4 | 4 |
| −20° | mJ/mm$^2$ | 2 | |
| Heat distortion temperature A °C. | | 70 | 64 |
| Heat aging resistance (150° C.) | hours | 800 | 450 |

TABLE 2

| Properties | Unit | Comp. B Talc | Comp. C Talc | Example 2 CLAY |
|---|---|---|---|---|
| Ignition residue (1h, 625° C.) | % | 19.5 | 20.8 | 20.6 |
| Melt flow index | | | | |
| MFI 230/5 | g/10 minutes | 18.1 | 21.8 | 19.6 |
| MVI 230/5 | g/10 minutes | 20.1 | 24.6 | 21.9 |
| Density | g/cm$^3$ | 1.023 | 1.041 | 1.041 |
| Ball indentation | | | | |
| hardness 30 seconds | N/mm$^2$ | 47 | 52 | 60 |
| Yield stress | N/mm$^2$ | 22 | 22.5 | 24 |
| Elongation | % | 5.6 | 5.5 | 5.0 |
| Stress at break | N/mm$^2$ | 9 | 9 | 13.5 |
| Elongation at break | % | 49 | 46 | 37 |
| Stress at 50% | N/mm$^2$ | 15 | 16 | — |
| Modulus of elasticity in tension (Secant) | N/mm$^2$ | 1680 | 1660 | 1670 |
| 3.5% bending stress | N/mm$^2$ | 26 | 27 | 28 |
| Maximum bending stress | N/mm$^2$ | 26 | 27.5 | 29 |
| Maximum edge fibre elongation | % | 3.6 | 3.9 | 4.1 |
| Modulus of elasticity in bending (tangent) | N/mm$^2$ | 1750 | 1810 | 1630 |
| Impact strength | | | | |
| (Charpy) +23° | mJ/mm$^2$ | NB | 127 | 110 |
| −20° | mJ/mm$^2$ | 75 | 37 | 38 |
| Notched impact strength | | | | |
| (Charpy) +23° | mJ/mm$^2$ | 15.3 | 10.3 | 7.3 |
| −20° | mJ/mm$^2$ | 4.5 | 3 | 3 |
| OIT (200° C.) | min | 44 | 31 | 37 |

NB = no break

TABLE 3

| Properties | Unit | Comparison D Talc | Example 5 Clay |
|---|---|---|---|
| Ignition residue (1h, 625° C.) | % | 20 | 21.5 |
| Melt flow index | | | |
| MFI 230/5 | cm$^3$/10 minutes | 40 | 37 |
| Density | g/cm$^3$ | 1.04 | 1.07 |
| Ball indentation | | | |
| hardness 30 seconds | N/mm$^2$ | 65 | 65 |
| Yield stress | N/mm$^2$ | 28 | 23 |
| Elongation | % | 4 | 4 |
| Tear strength | N/mm$^2$ | 4 | 15 |
| Elongation at tear | % | 35 | 30 |
| Modulus of elasticity in tension | N/mm$^2$ | 2200 | 1900 |
| Modulus of elasticity in bending | N/mm$^2$ | 2100 | 1800 |
| Impact strength | | | |
| (Charpy) +23° | N/mm$^2$ | 105 | 150 |
| −20° | N/mm$^2$ | 40 | 55 |
| Notched impact strength | | | |
| (Charpy) +23° | N/mm$^2$ | 6 | 7.5 |
| −20° | N/mm$^2$ | 3 | 3 |
| Heat distortion temperature A °C. | | 62 | 52 |

I claim:
1. A reinforced polypropylene molding composition essentially consisting of
a) 30 to 95 parts by weight
of a partly crystalline isotactic propylene homopolymer having an isotactic content of >80%, a degree of crystallinity of >50% and a melt flow index (230/5) of 0.5 to 1000 g/10 minutes, or
of a partly crystalline syndiotactic propylene homopolymer having a syndiotactic content of >80%, a syndiotactic sequence length of >10, a degree of crystallinity of >30% and a melt flow index (230/5) of 0.5 to 1000 g/110 minutes, or
of a partly crystalline propylene-ethylene, propylene-1-olefin or propylene-ethylene-1-olefin block copolymer or terpolymer with $C_4$–$C_8$-1-olefins, having an ethylene and/or 1-olefin content of 2 to 30% by weight and a melt flow index (230/5) of 0.5 to 1000 g/10 minutes, or
of a partly crystalline random propylene-ethylene, propylene-1-olefin or propylene-ethylene-1-olefin copolymer or terpolymer having an ethylene or-/and 1-olefin content of 0.5 to 30% by weight and a melt flow index (230/5) of 0.5 to 1000 g/10 minutes, b) 0 to 30 parts by weight
of a thermoplastic ethylene-propylene or/and ethylene-propylene-diene rubber having an ethylene content of >45% by weight and a Mooney viscosity ML (1+8) at 127° C. of 20 to 70, c) 0 to 10 parts by weight
of an unbranched polyethylene having a density of 0.94 to 0.965 g/cm$^3$ and a degree of crystallinity of 60 to 80%, and d) 5 to 60 parts by weight
of a clay mineral having an SiO$_2$ content of 55 to 80% by weight and an Al$_2$O$_3$ content of 10 to 30% by weight and a particle size top cut (at least 95%) of <20 μm.

2. A molded article comprising a reinforced polypropylene molding composition of claim 1 which has been shaped to form said article.

3. A molded article as claimed in claim 2, wherein said article has been shaped by injection molding.

4. A molded article as claimed in claim 2, wherein said article is an automobile part.

5. Moldable pellets cut from extruded strands wherein the pellets consist essentially of the molding composition of claim 1.

6. A method for preparing moldable pellets comprising the steps of: mixing the composition of claim 1 in a fluid mixer; compounding the resulting powder mixture in an extrusion device; and granulating the resulting extrudate.

7. The reinforced propylene molding composition as claimed in claim 1, wherein the clay mineral has a SiO$_2$ content of 63 to 66% by weight, and an Al$_2$O$_3$ content of 19 to 22% by weight.

8. The molding composition as claimed in claim 1, further containing
e) oxidation stabilizers,
f) light-stabilizing finish for internal and/or external uses with UV absorbers and/or hindered amine light stabilizers;
g) processing auxiliaries;
h) anti-statics; and
i) colored pigments or mixtures of e)-i) above.

9. The molding composition as claimed in claim 8, wherein the oxidation stabilizers are selected from the group consisting of sterically hindered phenols, thioethers, phosphites and phosphonites.

10. The molding composition as claimed in claim 8, wherein the composition consists of from 0.1 to 2 parts by weight of an oxidation stabilizer;
from 0.1 to 3 parts by weight of a light-stabilizing finish for internal and/or external uses with UV absorbers and/or hindered amine light stabilizers;
from 0.1 to 3 parts by weight of processing auxiliaries; and
from 0 to 10 parts by weight of antistatics.

11. The molding composition as claimed in claim 10, wherein there is from
50 to 95 parts by weight of component a);
5 to 20 parts by weight of component b);
1 to 3 parts by weight of component c);
10 to 40 parts by weight of component d);
0.1 to 1.0 parts by weight of component e);
from 0.2 to 0.5 parts by weight of component f);
from 0.1 to 1.5 parts by weight of component g);
and from 0.2 to 2 parts of weight of component h).

12. The moldable pellets as claimed in claim 5, wherein the pellets have an average length of 2 to 5 mm.

13. A molded article as claimed in claim 3, wherein said article has been shaped by injection molding using an injection molding machine with temperatures ranging from 180° to 300° C. and flow front speeds are between 50 to 500 mm/sec.

14. The composition as claimed in claim 1, wherein the clay mineral has a composition of about 45% by weight of muscovite (mica) about 39% by weight quartz, about 14% by weight kaolinite, about 2% by weight of a secondary constituents.

* * * * *